Patented Apr. 1, 1930

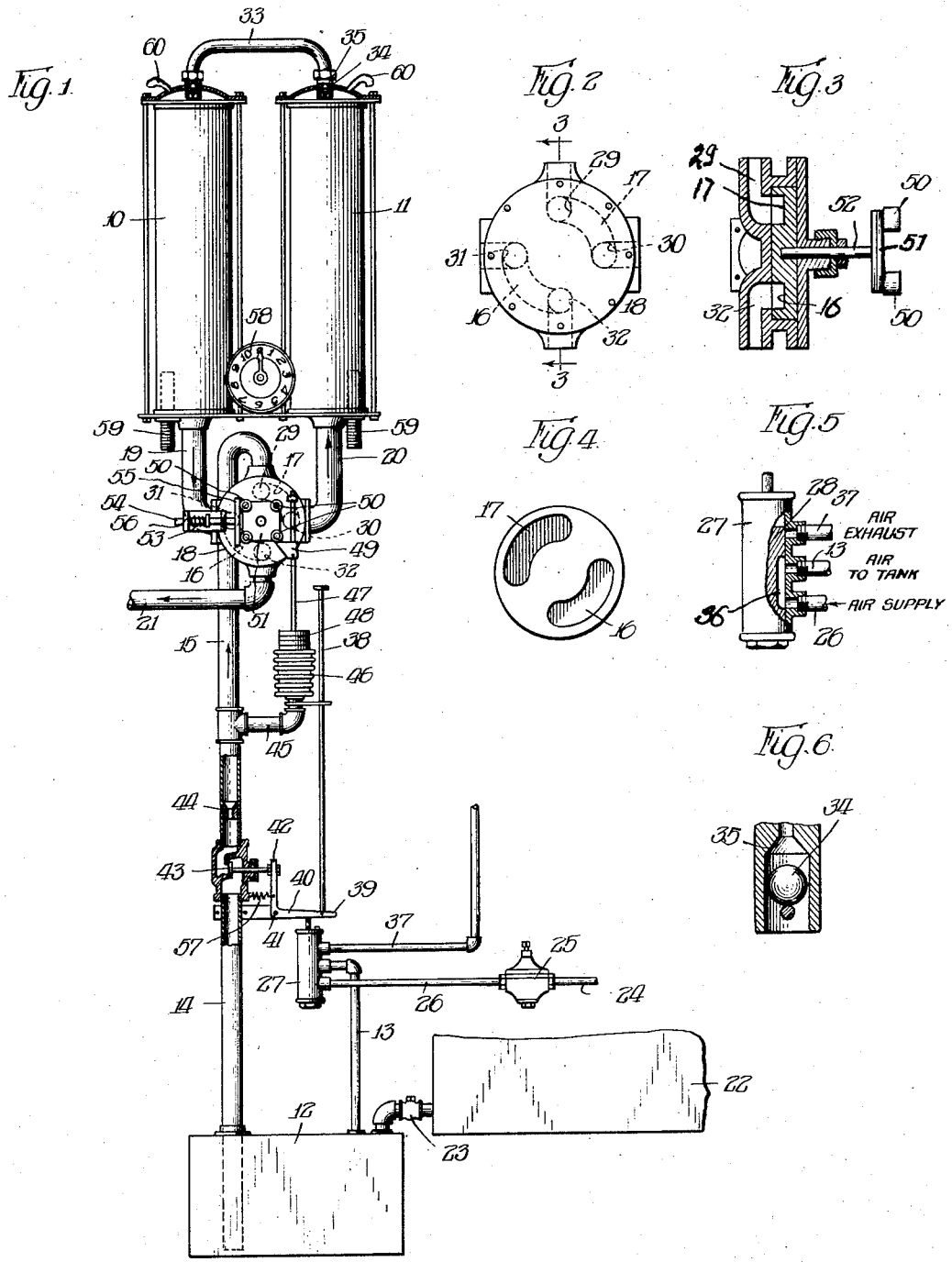

1,752,934

UNITED STATES PATENT OFFICE

WILLIAM S. TOWNSEND AND WALTER H. PARKER, OF ROCHESTER, PENNSYLVANIA, ASSIGNORS, BY MESNE ASSIGNMENTS, TO THE WAYNE PUMP COMPANY, OF BALTIMORE, MARYLAND, A CORPORATION OF MARYLAND

LIQUID-DISPENSING ARRANGEMENT

Application filed February 19, 1926. Serial No. 89,285.

This invention relates to a liquid dispensing arrangement.

One object of the invention is to provide simple, reliable and efficient liquid dispensing apparatus which will permit a continuous flow of liquid to be measured and dispensed, thereby reducing to a minimum the time required for supplying a motor vehicle.

Another object is to provide apparatus of the above mentioned type in which liquid is accurately measured and dispensed.

Another object is to provide apparatus of the type indicated in which the various parts of the apparatus are timed and controlled to secure accurate measurement of liquid and facilitate the dispensing thereof.

Another object is to alternately supply to each of a plurality of measuring chambers a predetermined amount of liquid under a relatively low pressure, any excess of supplied liquid being effective for building up an increased liquid pressure for actuating or causing the actuation of a reversible valve for controlling the supply of liquid to and the discharge of liquid from the measuring chambers.

Another object is to provide liquid dispensing apparatus wherein there is used a constant low pressure on the liquid supply tank and also whereby in the supply line the pressure of the liquid at a point near the measuring chambers is normally lower than in other parts of the supply system.

Another object is to control the various parts of the apparatus and the flow of liquid in a manner to meet all of the requirements for successful commercial use.

These and other objects are accomplished by means of the arrangement disclosed on the accompanying sheet of drawings, in which—

Figure 1 is a vertical longitudinal sectional view, parts being in section, of liquid dispensing apparatus embodying our invention;

Figure 2 is a front elevation on an enlarged scale of the reversible valve;

Figure 3 is a sectional view taken in the plane of line 3—3 of Figure 2;

Figure 4 is a detail front elevation of a rotary valve member;

Figure 5 is an enlarged side elevation, parts being in section, of the air control valve; and Figure 6 is an enlarged sectional view of the air connection between the measuring chambers and showing one of the float valves.

The various novel features of the invention will be apparent from the following description and drawings, and will be particularly pointed out in the appended claims.

Referring to the figures of the drawings, in which the apparatus is shown somewhat diagrammatically, it will be noted that the invention is illustrated in connection with continuous flow liquid dispensing apparatus including two preferably transparent measuring chambers or containers 10 and 11 into which liquid is forced from any suitable source represented by the auxiliary supply tank 12, liquid being forced therefrom by air under pressure transmitted through a pipe 13, the liquid being forced from auxiliary tank 12 through pipes 14 and 15 and alternately through passages 16 and 17 in a reversible valve 18 and respectively through pipes 19 and 20 into said measuring chambers 10 and 11 respectively. After the liquid is measured within the measuring chambers 10 and 11, it is discharged alternately from said chambers through the same pipes 19 and 20 and through passageways in the valve 18 and out through the dispensing or service pipe 21 to which a hose or the like may be connected.

As shown in Figures 1 and 2 of the drawings, liquid is being forced from the supply pipe through a valve port 29, valve arcuate passageway 17, valve port 30, and pipe 20 into measuring chamber 11. At the same time liquid which has been measured in measuring chamber 10 is passed downwardly and outwardly through pipe 19, valve port 31, valve arcuate passageway 16, valve port 32 and out through dispensing pipe 21. As liquid rises in the measuring chamber 11, air is forced by said rising liquid from the upper part of said chamber through an air pipe 33 into the upper part of the other measuring chamber 10. Air will continue to be transferred from chamber 11 to chamber 10 until the liquid rises up into engagement with and presses a float valve 34 into closed position against its seat 35. When the float valve 34 closes, the supply of liquid to the measuring chamber ceases, but it is to be understood that liquid continues to be supplied in an excess amount. As a result thereof, liquid pressure is built up in the supply pipe 15. In the arrangement shown, we take advantage of this built up liquid pressure for actuating the reversible valve 18 from one of its operative positions to another one of its operative positions for reversing the charge of liquid to and the discharge of liquid from said measuring chambers.

Before going into detail on this feature, it is to be pointed out that liquid is supplied to the auxiliary storage tank 12 from a main storage reservoir 22 through a valve control connection 23 which permits flow of liquid from the main tank 22 to the auxiliary tank 12 but does not permit a flow in the reverse manner. Air under pressure is supplied from any suitable source represented by reference character 24, the pressure of which air being reduced by a reducing valve 25 before the air passes into a pipe 26 connected to valve casing 27. Slidably mounted in the valve casing 27 is a slide valve 28 having an air passageway 36, which as shown in Figure 5, connects the air supply pipe 26 with pipe 13 leading to the auxiliary tank 12, the exhaust pipe 37 being closed by the valve 28 under such circumstances. When the slide valve 28 is in its raised or other position, spring pressed or otherwise operated, the tank pipe 13 will be connected with the exhaust pipe 37 for exhausting the air from the auxiliary tank 12.

Let it be assumed that the slide valve 28 is in the position shown in Figure 5 and it is desired to supply liquid to the measuring chambers. This is done by depressing a suitably supported operating rod 38, which at its lower end is pivotally connected to one arm 39 of a bell crank lever 40 pivoted to a suitable support at 41, the other arm 42 of which bell crank is connected to a valve 43 connecting pipes 14 and 15. Bell crank lever arm 39 is connected to the slide valve 28. Accordingly, when the rod 38 is depressed, the air valve connection is as shown in Figure 5 and the liquid control valve 43 is in open position, the degree of which depends upon the extent the rod 38 is depressed. Accordingly, liquid will be forced under air pressure up through the pipes 14 and 15 and past the reversible control valve 18 and alternately into the measuring chambers 10 and 11, it being understood that when one of said measuring chambers is being filled, the other is being emptied. Mounted in the supply pipe 15 above the liquid control valve 43 is a member 44 having an orifice whereby the pressure of the liquid below the orifice normally is greater than the pressure of the liquid above the orifice. For example, the pressure of the liquid below the orifice may be ten pounds whereas the pressure of the liquid above the orifice normally would be but five pounds so that liquid will be supplied to the measuring chambers 10 and 11 under a relatively low pressure. As shown in Figures 1 and 2 of the drawings, liquid is being supplied to the measuring chamber 11 and liquid is being discharged from the other measuring chamber 10. As soon as the measuring chamber 11 becomes filled, it being understood that the supply of liquid is being continued before the reversal of the control valve 18, the pressure in the pipe 15 will be increased from the five pounds pressure and will continue to increase until the pressure is relieved. This increased liquid pressure is transmitted through a pipe 45 to an expansible bellows 46 which is provided with a rod 47 having a predetermined number of weights 48 by means of which the expansible bellows is prevented from expanding until a certain predetermined pressure is built up in pipe 15. Mounted on the operating rod 47 is a pawl 49 which is adapted to successively engage rollers or projections 50 carried by a plate 51 which is secured to the shaft 52 of the reversible valve 18.

Under the conditions imposed, with increased liquid pressure in the pipe due to excess liquid supply, liquid pressure extends to the expansible bellows 46 for expanding same for raising the operating rod 47, which, through the pawl 49 and one of the projections 50, causes the control valve 18 to be rotated through an angle of ninety degrees thereby reversing the connections so that liquid is then supplied to the measuring chamber 10 while liquid is being discharged from measuring chamber 11. In rotating the control valve 18 after it has been rotated through an angle of slightly over forty-five degrees, said valve is snapped into this ninety degrees position due to the action of a coiled spring 53 which is coiled around a stem 54 to which a plate 55 is secured, the latter being in direct engagement with one or more of the projections 50, as the case may be. When the valve 18 is in any one of its operative positions for permitting the discharge of liquid therethrough, the plate 55 engages two of the projections 50, as shown in Figure 1, the plate thereby acting as a yieldable lock for locking the reversible valve in operative position. The plate 55 and its rod 54 may be supported from any suitable bracket 56. When the valve 18 is reversed, liquid pressure in the expansible bellows 46 and pipe 45 and supply pipe 15 is again reduced, the excess liquid in bellows 46 flowing back into the pipe 15 and being supplied to the measuring chamber being filled. It will be understood that the pressure in supply pipe 15 under such circumstances is again reduced to the lower value, such as five pounds. By virtue of the fact that orifice 44 is located below the bellows connections, such bellows 46 normally is subjected only to the five pounds pressure, and accordingly does not expand for reversing or actuating the valve until the measuring chamber being filled is completely filled and the pressure in the supply pipe 15 is again increased.

A continued operation of this device will result in supplying any number of measured units of liquid, successive quantities depending on the volume of the measuring chambers. This operation will continue until the rod 38 is released and the spring 57 raises said rod and accordingly closes valve 43 and moves slide valve 28 into a position to connect tank pipe 13 and exhaust pipe 37.

Indicating mechanism 58 may be operatively connected to the reversing valve in any desirable manner to indicate the number of gallons measured. Calibrating plugs 59 are shown for calibrating the measuring chambers 10 and 11. Suitable vent control connections 60 are provided at the upper end of each of the measuring chambers 10 and 11 to connect the interior of said chambers to the atmosphere when it is desired to empty one of said measuring chambers when the other of said chambers is not being filled.

By means of the arrangement hereinabove described, the objects of the invention are accomplished.

We claim:

1. In liquid dispensing apparatus, the combination of a measuring container, a liquid supply line for supplying liquid to said container, means for normally reducing the pressure of the supplied liquid at a given point in the supply line, means for controlling the supply of liquid to said container, and means responsive to increased pressure on the low pressure side of said point for causing operation of said controlling means.

2. In liquid dispensing apparatus, the combination of a measuring container, a liquid supply line for supplying liquid to said container, means for normally reducing the pressure of the supplied liquid at a given point in the supply line, means for controlling the supply of liquid to said container, and means responsive to a change in pressure on one side of said point for causing operation of said controlling means.

3. In liquid dispensing apparatus, the combination of a measuring container, a liquid supply line for supplying liquid to said container, means in said supply line for normally reducing the pressure of the supplied liquid at a given point in the supply line, means for controlling the supply of liquid to said container, and means responsive to increased pressure on the low pressure side of said point for causing actuation of said controlling means.

4. In liquid dispensing apparatus, the combination of a measuring container, a liquid supply line for supplying liquid to said container, means for normally reducing the pressure of the supplied liquid at a given point in the supply line, means for controlling the supply of liquid to said container, and means operatively associated with said liquid supply line and responsive to liquid pressure of the supplied liquid for actuating said controlling means.

5. In liquid dispensing apparatus, the combination of a measuring container, a liquid supply pipe through which liquid is supplied thereto, means for normally reducing the pressure of the supplied liquid on one side of a given point in the supply pipe, a valve for controlling the supply of liquid to said container, and means responsive to increased pressure on the low pressure side of said point for causing actuation of said valve.

6. In liquid dispensing apparatus, the combination of a measuring container, a supply pipe through which liquid is supplied thereto, a valve for controlling the supply of liquid to said container, fluid pressure means for causing liquid to flow through said supply pipe to said container, means for normally reducing the pressure of the supplied liquid on one side of a given point in said supply pipe, and means associated with the low pressure side of said point and responsive to a variation in pressure for causing actuation of said valve.

7. In liquid dispensing apparatus, the combination of a measuring container, a supply pipe through which liquid is supplied to said container, means for controlling the supply of liquid to said container, means for normally reducing the pressure of the supplied liquid in said supply pipe on one side of a given point, and an expansible bellows on the low pressure side of said point responsive to variation in liquid pressure developed in said supply pipe for causing actuation of said control means.

8. In liquid dispensing apparatus, the combination of a measuring container, means for supplying liquid thereto, means for controlling the supply of liquid to said container, means for normally reducing the pressure of the supplied liquid on one side of a given point, means whereby when said measuring container has received a predetermined amount of liquid any excess amount of liquid will devolop an increased liquid pressure on the low pressure side of said point, and means responsive to such increased pressure for causing actuation of said controlling means.

9. In liquid dispensing apparatus, the combination of a measuring container, means for supplying liquid thereto, means for controlling the supply of liquid thereto, means for normally reducing the pressure of the supplied liquid on one side of a given point, said supply means having a capacity greater than the capacity of said measuring container whereby an excess pressure is developed in the supply line after said measuring container is filled, and means responsive to increased pressure on the low pressure side of said point for causing actuation of said controlling means.

10. In liquid dispensing apparatus, the combination of a plurality of measuring containers, means for supplying liquid thereto, a reversible valve for controlling the supply of liquid alternately to said containers, means for normally reducing the pressure of the supplied liquid on one side of a given point, and means responsive to increased pressure on the low pressure side of said point for causing actuation of said reversible valve.

11. In liquid dispensing apparatus, the combination of a plurality of measuring containers, means for supplying liquid thereto, a reversible valve for controlling the supply of liquid alternately to said containers, means for normally reducing the pressure of the supplied liquid on one side of a given point, and means responsive to a changed pressure on the low pressure side of said point for causing actuation of said reversible valve.

12. In liquid dispensing apparatus, the combination of a plurality of measuring containers, means for supplying liquid thereto, a reversible valve for controlling the supply of liquid to and the discharge of liquid from said containers, means for normally reducing the pressure of the supplied liquid on one side of a given point, an excess flow connection to said liquid supply means, and means operatively connected to said excess flow connection responsive to increased pressure on the low pressure side of said point for causing actuation of said reversible valve.

13. In a liquid dispensing apparatus, the combination of a measuring container, means for controlling the supply of liquid to said container, a supply pipe connected to said means and to a source of supply, means associated with said source of supply for forcing liquid through said supply pipe, means for controlling said last named means, and a valve in said supply pipe operated by said second named control means for permitting liquid flow through said supply pipe.

14. In a liquid dispensing apparatus, the combination of a measuring container, means for controlling the supply of liquid to said container, a supply pipe connected to said means and to a source of supply, means associated with said source of supply for forcing liquid through said supply pipe, means for controlling said last named means, a valve in said supply pipe operated by said second named control means for permitting liquid flow through said supply pipe, and means in said supply pipe between said valve and said first named control means for regulating liquid pressure in said supply pipe.

15. In a liquid dispensing apparatus, the combination of a measuring container, means for controlling the supply of liquid to said container, a supply pipe connected to said means and to a source of supply, means associated with said source of supply for forcing liquid through said supply pipe, means for controlling said last named means, a valve in said supply pipe operated by said second named control means for permitting liquid flow through said supply pipe, means in said supply pipe between said valve and said first named control means for regulating liquid pressure in said supply pipe, and pressure sensitive means in said supply pipe between said last named means and said first named control means for operating said control means.

Signed at Rochester, Pennsylvania, this 15th day of February, 1926.

WILLIAM S. TOWNSEND.
WALTER H. PARKER.